United States Patent
Martin et al.

(10) Patent No.: US 9,670,849 B2
(45) Date of Patent: Jun. 6, 2017

(54) ENGINE REFURBISHMENT USING IONIZED AIR

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 14/632,856

(22) Filed: Feb. 26, 2015

(65) Prior Publication Data

US 2016/0252025 A1    Sep. 1, 2016

(51) Int. Cl.
| | |
|---|---|
| F02M 27/00 | (2006.01) |
| F02D 21/02 | (2006.01) |
| F02M 27/04 | (2006.01) |
| F01L 1/04 | (2006.01) |
| F01L 1/34 | (2006.01) |
| F02B 77/04 | (2006.01) |
| F02D 29/02 | (2006.01) |

(Continued)

(52) U.S. Cl.
CPC ............. *F02D 21/02* (2013.01); *F01L 1/04* (2013.01); *F01L 1/34* (2013.01); *F02B 77/04* (2013.01); *F02D 29/02* (2013.01); *F02D 41/0002* (2013.01); *F02D 41/22* (2013.01); *F02M 27/04* (2013.01); *F02B 2075/125* (2013.01); *F02D 13/0207* (2013.01); *F02M 25/12* (2013.01); *F02M 26/05* (2016.02); *F02M 26/06* (2016.02); *F02M 26/63* (2016.02)

(58) Field of Classification Search
CPC .. F02D 21/02; F02D 41/0087; F02D 41/2406; F02D 41/26; F02D 29/02; F02D 13/027; F02B 77/04; F02B 73/00; F02B 2075/125; F02M 27/04; F02M 26/06; F02M 26/05; F02M 26/63; F02M 25/10; F02M 25/12; F01L 1/34; F01L 1/04
USPC ........................................ 123/536, 537, 539
See application file for complete search history.

(56) References Cited

U.S. PATENT DOCUMENTS

| | | | |
|---|---|---|---|
| 4,519,357 A | 5/1985 | McAllister | |
| 5,010,869 A | 4/1991 | Lee | |

(Continued)

FOREIGN PATENT DOCUMENTS

CA      1265004      1/1990

OTHER PUBLICATIONS

Martin, D. et al., "Method and System for Gas Particulate Filter," U.S. Appl. No. 14/540,307, filed Nov. 13, 2014, 50 pages.

(Continued)

*Primary Examiner* — Hai Huynh
(74) *Attorney, Agent, or Firm* — Julia Voutyras; McCoy Russell LLP (57) ABSTRACT

Methods and systems are provided for refurbishing an engine using ionized air. During a service mode, a service technician may stream ionized air from an external ionized air source to an engine cylinder via the engine intake system. Concurrently, the service technician may connect a service tool to a vehicle diagnostics port to relay operator input, the input allowing a vehicle control system to rotate the engine and adjust engine throttle and cams.

19 Claims, 4 Drawing Sheets

(51) Int. Cl.

| | | |
|---|---|---|
| *F02D 41/22* | (2006.01) | |
| *F02D 41/00* | (2006.01) | |
| F02M 25/12 | (2006.01) | |
| F02M 26/63 | (2016.01) | |
| F02D 13/02 | (2006.01) | |
| F02B 75/12 | (2006.01) | |
| F02M 26/05 | (2016.01) | |
| F02M 26/06 | (2016.01) | |

(56) References Cited

U.S. PATENT DOCUMENTS

| | | | |
|---|---|---|---|
| 8,365,700 B2* | 2/2013 | McAlister | F02D 35/021 123/297 |
| 9,222,455 B2* | 12/2015 | Martin | F02P 23/04 |
| 2014/0123924 A1* | 5/2014 | McAlister | F02M 57/06 123/143 B |
| 2014/0316621 A1 | 10/2014 | Martin et al. | |
| 2014/0316622 A1 | 10/2014 | Martin et al. | |

OTHER PUBLICATIONS

Martin, D. et al., "Method and System for Reducing Engine Exhaust Emissions," U.S. Appl. No. 14/689,309, filed Apr. 17, 2015, 40 pages.

* cited by examiner

ENGINE REFURBISHMENT USING IONIZED AIR

FIELD

The present application relates to methods and systems for refurbishing an engine using an engine ionized air delivery system.

BACKGROUND AND SUMMARY

Engine components (such as cylinders and valves) may degrade with age in various ways. For example, sludged throttle bodies can restrict airflow. As another example, soot deposit on spark plugs can increase knock limitation while soot build-up on particulate filters can degrade engine performance due to increased back-pressure. While engine controls may be adapted to adjust engine operation based on the changing range of component performances, the range that can be compensated for may be fairly narrow. Even within that range, there may be a limited number of adjustments that can be performed. As a result, either extensive cleaning or intermittent replacement of engine components may be required to maintain acceptable engine performance for an extended amount of time. However, this may add unacceptable costs to vehicle operation, in addition to warranty issues. Overall, a vehicle customer satisfaction may be reduced.

The inventors herein have recognized that ionized air can be advantageously used to reduce engine component degradation. Specifically, a service technician may be able to send an ion-rich air stream through the air injection system of an engine to oxidize and remove organic matter from the engine system. In one example, a method for reducing engine component degradation comprises: introducing ionized air into an engine cylinder while rotating the engine unfueled; and oxidizing organic matter in the cylinder using the introduced ionized air. In this way, engine performance degradation due to accumulation of soot and sludge on various components can be reduced.

For example, during non-combusting conditions, a service technician may couple an external source of ionized air to an engine intake, specifically, to an air intake throttle or to an air intake system. Ionized air may then be blown from the air source through the engine intake to engine cylinders where cylinder organic matter (e.g., hydrocarbons and oil) may be oxidized. The ionized air may then be flowed from the cylinder to the engine exhaust system where exhaust organic matter (e.g., hydrocarbons, oil, soot, etc.) may be oxidized. The service technician may concurrently connect a service tool to a diagnostics port (e.g., OBD port) of the vehicle. When connected to the diagnostics port, the service tool may be communicatively coupled to a vehicle control system, allowing operator input received via the service tool to be relayed into engine powertrain commands. For example, based on the operator input, while flowing the ionized air, an intake throttle may be fully opened, an EGR valve may be fully opened, and/or intake and exhaust cams may be advanced. In addition, the engine may be rotated or spun, unfueled, to allow for ionized air to be delivered to all engine cylinders.

In this way, engine components may be cleaned and refurbished in a more cost-effective and simpler manner. By streaming ionized air into the engine, organic matter such as oil, sludge, hydrocarbons and soot can be oxidized and easily removed from the engine system. By concurrently rotating the engine, unfueled, ionized air can be delivered to each engine cylinder, enabling a more complete cleaning of the engine. By not requiring the engine components to be disassembled for the cleaning, the cost, labor, and time required to refurbish the engine is significantly reduced. By using ionized air to periodically tune-up the engine, engine performance may be improved and component life may be increased. Overall, engine warranty may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
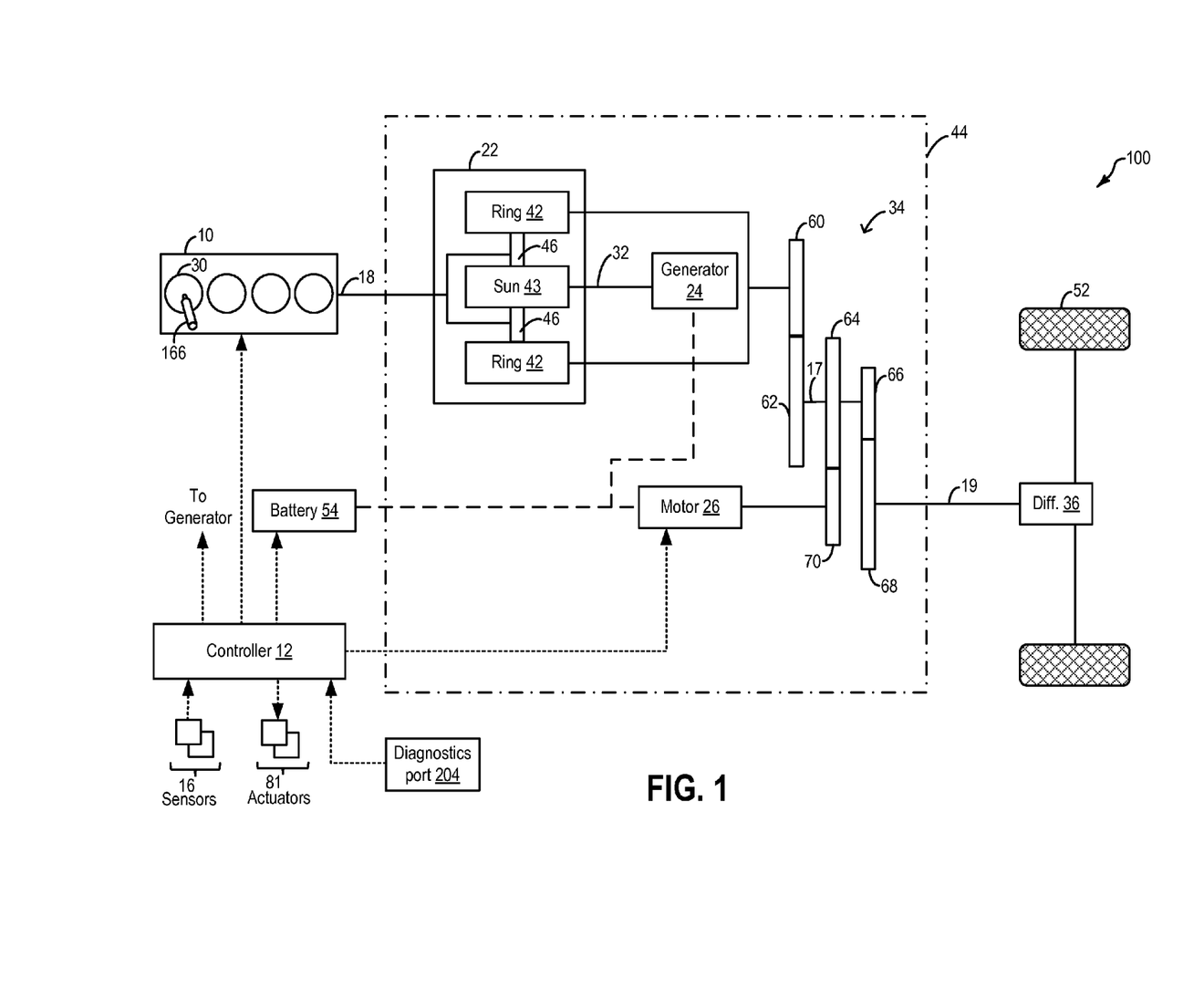
FIG. 1 shows an example hybrid vehicle system.
Figure 2:
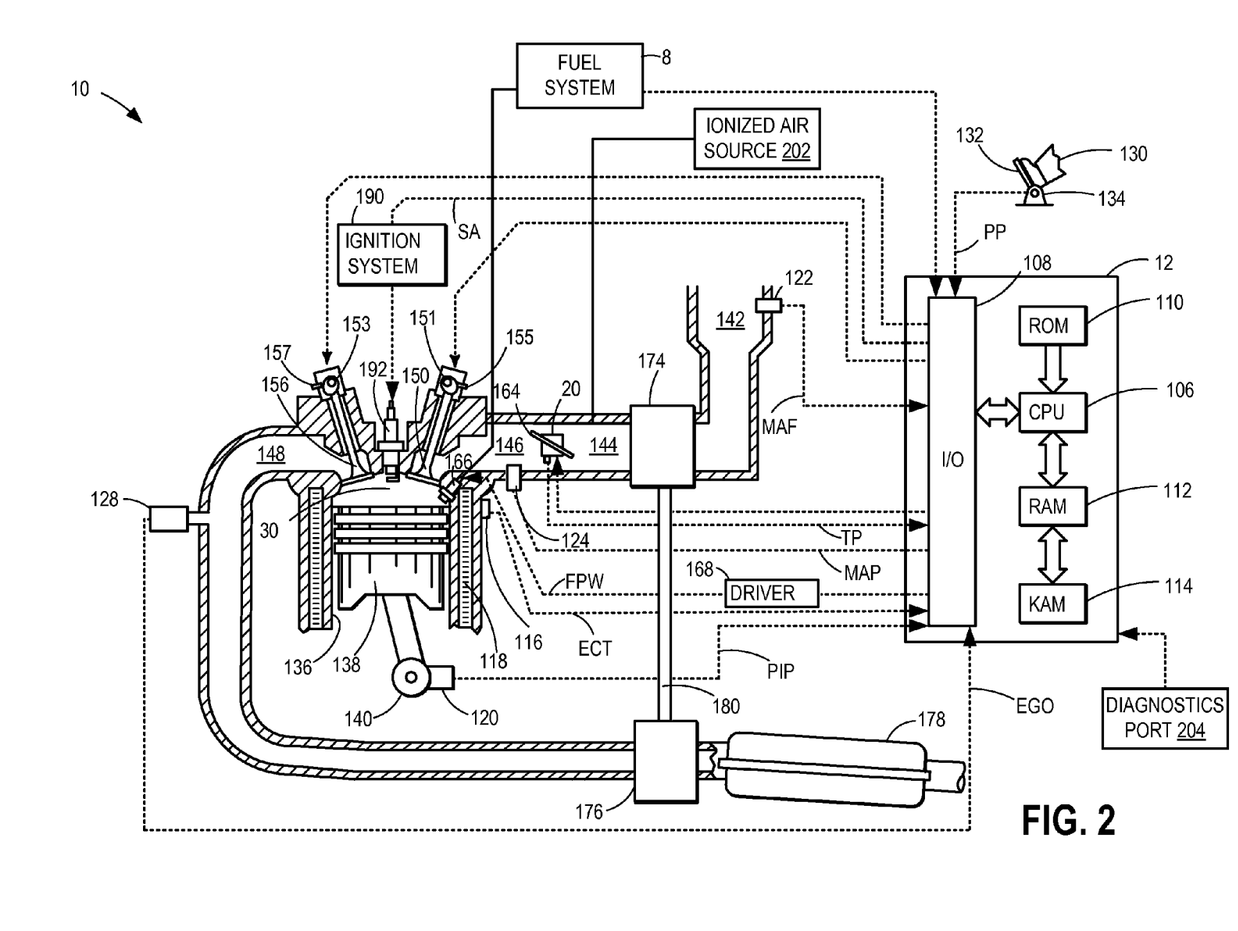
FIG. 2 shows an example internal combustion engine of the hybrid vehicle system of FIG. 1.

Methods and systems are provided for enabling repair and refurbishment of an engine system coupled in a vehicle, such as the system of FIGS. 1-2, using ionized air from an air source external to the vehicle. Ionized air may be streamed into an engine by a service technician by hooking up the engine intake system to the ionized air source. The technician may also couple a service tool to the vehicle's diagnostic port thereby coupling the service tool to an engine control system. Based on input from the service technician, received via the service tool, an engine controller may be configured to perform a control routine during a service mode of the engine, such as the routine of FIG. 3, to adjust one or more engine components while streaming the ionized air. For example, ionized airflow may be accompanied by adjustments to throttle opening, EGR valve opening, and cam timing. In addition, the engine may be spun and fueled via an electric motor based on the input from the service technician, thereby allowing the ionized air to be circulated through all engine cylinders. Organic matter present in the intake may be oxidized by the ionized air and expelled through the exhaust. In addition, the ionized air may be streamed through the engine exhaust allowing organic matter in the exhaust to be oxidized and expelled. An example cleaning procedure is shown with reference to FIG. 4. In this way, engine refurbishing may be performed faster, and at a lower cost.

FIG. 1 depicts a hybrid propulsion system 100 for a vehicle. In the depicted embodiment, the vehicle is a hybrid electric vehicle (HEV). Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 166.

Engine 10 delivers power to transmission 44 via torque input shaft 18. In the depicted example, transmission 44 is a power-split transmission (or transaxle) that includes a planetary gearset 22 and one or more rotating gear elements.

Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor. Due to the mechanical properties of the planetary gearset, generator 24 may be driven by a power output element (on an output side) of the planetary gearset 22 via mechanical connection 32, as further elaborated below.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 50 may be operated as a motor or generator, as required, to augment or absorb torque provided by the engine, such as during a transition of engine 10 between different combustion modes (e.g., during transitions between a spark ignition mode and a compression ignition mode).

Planetary gearset 22 comprises a ring gear 42, a sun gear 43, and a planetary carrier assembly 46. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements. Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

Propulsion system 100 may further include a diagnostics port 204. In one example, the diagnostics port may be an OBD port. The diagnostics port may be located, for example, in the vehicle cabin near the steering wheel, or under the vehicle hood. By coupling a service tool to the diagnostics port, a service technician may retrieve one or more diagnostic codes indicative of the results of one or more diagnostic tests of various vehicle components. Based on the diagnostic codes retrieved, the service technician may determine which components of the vehicle need repair or replacement.

Figure 3:
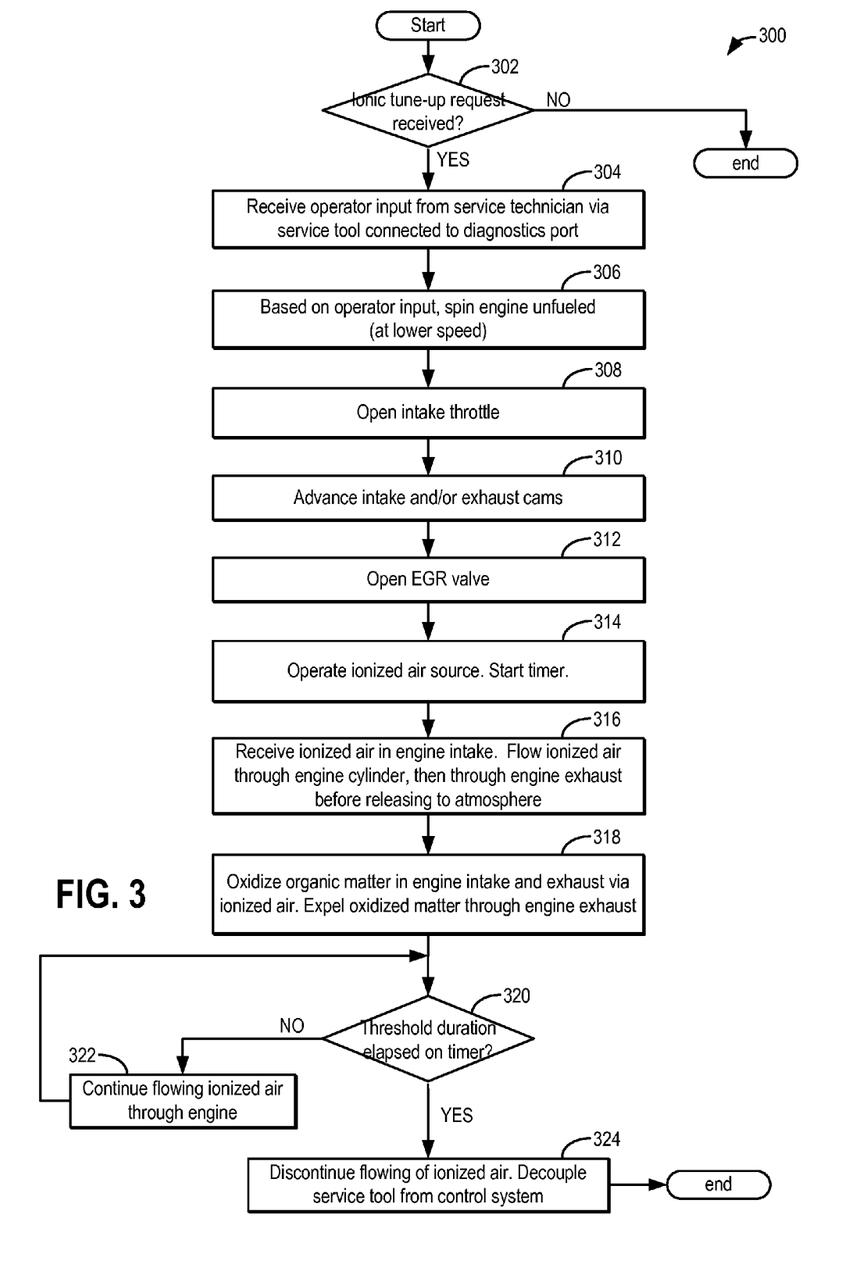
FIG. 3 shows a high level flow chart of a method for refurbishing an engine using a stream of ionized air during a service mode of vehicle operation.

As elaborated herein with reference to FIG. 3, during selected conditions, motor 26 and/or generator 24 may be used to spin engine 10 unfueled. In particular, during conditions when propulsion system 100 is operated in a service mode, with engine 10 not combusting, ionized air may be delivered to the engine while battery power may be used to operate the motor/generator to spin the engine unfueled. By spinning the engine unfueled while ionized air is streamed into the engine, ionized air may be efficiently delivered to all engine cylinders, enabling a more thorough cleaning of the engine. During the spinning, the service technician may connect a service tool to diagnostics port 204, thereby coupling the service tool to the vehicle's controller 12. Based on operator input received from the service technician via the service tool, one or more vehicle and engine system components may be adjusted to improve the flow of ionized air throughout the engine. For example, an intake cam may be fully advanced and an intake throttle may be fully opened to increase the flow of ionized air to the cylinders. Still other adjustments may be performed.

It will be appreciated that while the propulsion system is shown as a hybrid vehicle, in alternate embodiments, the propulsion system may not be a hybrid electric vehicle but a non-HEV vehicle propelled only via an internal combustion engine. In such an embodiment, the service technician may couple the service tool to the diagnostics port and spin the engine unfueled via a starter motor of the engine or a 12V battery of the engine. The spinning may be performed via the starter motor if a charger is coupled to the 12V battery to avoid depletion. The hybrid vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 52 (the generator may also be providing torque to wheels if in motoring mode). During the "engine" mode, fuel may be supplied to engine 10 from a fuel tank via fuel injector 166 so that the engine can spin fueled to provide the torque for propelling the vehicle.

The vehicle may also be driven in an "assist" mode wherein engine 10 is operated and used as the primary source of torque for powering wheels 52 and the electric motor is used as an additional torque source to act in cooperation with, and supplement the torque provided by, engine 10. During the "assist" mode, fuel is supplied to engine 10 so as to spin the engine fueled and provide torque to the vehicle wheels.

In still another example, the vehicle may be driven in an engine-off mode, herein also referred to as an electric-only mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, during braking, low speeds, while stopped at traffic lights, etc.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Controller 12 may receive input data from the various sensors, process the input data, and trigger the actuators in response to the processed input data based on instruction or code programmed therein corresponding to one or more routines. An example control routine is described herein with regard to FIG. 3.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. As another example, input may be received from the vehicle operator regarding a desired mode of downhill travel based on a position of button 58, as previously discussed with reference to FIG. 1. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. For example, generator 24 and/or motor 26 of FIG. 1 may be coupled to the crankshaft to provide torque for engine cranking.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

In some embodiments, an exhaust gas recirculation passage may be configured to recirculate at least a portion of exhaust gas from the exhaust passage to the intake passage. A flow of recirculated exhaust gas (EGR) may be adjusted via an EGR valve coupled to the EGR passage. The EGR passage may be configured to provide low pressure exhaust gas recirculation (LP-EGR) wherein the exhaust gas is recirculated from the exhaust passage, downstream of turbine 176 to the intake passage, upstream of compressor 174. Alternatively, the EGR passage may be configured to provide high pressure exhaust gas recirculation (HP-EGR) wherein the exhaust gas is recirculated from the exhaust passage, upstream of turbine 176 to the intake passage, downstream of compressor 174. Further still, the engine may be configured to provide LP-EGR and HP-EGR via respective passages and valves.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder. Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold pressure signal (MAP) from sensor 124, cylinder AFR from EGO sensor 128, and abnormal combustion from a knock sensor. Engine speed signal, RPM, may be generated by controller 12 from signal PIP.

Storage medium read-only memory 110 can be programmed with computer readable data representing instructions executable by processor 106 for performing the methods described below as well as other variants that are anticipated but not specifically listed.

As such, with age, the various engine components may undergo varying degrees and types of degradation. As an example, throttle 20 may become sludged. As such, sludged throttle bodies can cause engine starting problems due to restricted airflow. As another example, engine valve deposits can cause degraded open loop fuel accuracy, which in turn degrades fuel efficiency. As yet another example, carbon (e.g., soot) may be build up on the spark plug, causing higher knock limitations which degrade fuel efficiency. As still another example, soot may build up on an exhaust particular filter, degrading emissions and increasing exhaust back-pressure. While regular regeneration of the filter may be performed to remove soot build up, there may be some drive cycles (e.g., Granny cycle) that can lead to excessive soot build-up that cannot be addressed by regeneration alone. Further still, on hybrid vehicles having an engine running on the Atkinson cycle, the engine may run cooler leading to accelerated spark plug fouling. The engine may also have more blow-back because of late intake valve closure which leads to more throttle sludge as well as more contamination of upstream components like a hydrocarbon trap. In hybrid vehicles, the reliability of the engine pull-up needs to be extremely repeatable and robust. Failed pull-ups due to aging factors like sludged throttle body, and spark plug fouling can adversely influence warranty and degrade customer satisfaction.

Some of the above-discussed issues may require component cleaning or even component replacement so as to maintain acceptable operation of the engine for an extended amount of time. In addition, various advanced engine control approaches may be used to adapt and adjust to the changing component performance. However, the range that can be compensated for may be fairly narrow. The need for frequent cleaning or replacement increases cost of operation as well as warranty issues. Further, the need for disassembling the engine to clean or replace the component can add time and labor costs, as well as the risk for additional damage during disassembly/reassembly.

To address these issues, an affordable, and quick method for restoring the engine to optimal conditions without disassembling the engine involves the use of ionized air. As elaborated with reference to FIG. 3, ionized air may be introduced into an engine cylinder while rotating the engine unfueled, allowing for organic matter in the cylinder to be oxidized and removed using the introduced ionized air. To achieve this, a source of ionized air 202 may be couplable to the air induction system of the engine, such as to air intake passage 142 and/or to intake throttle 20 for delivering a stream of ionized air to the engine cylinders. The source of ionized air may be an external air source such as ionized shop air from an air compressor. As such, matter changes its state when energy is supplied to it, specifically, solids become liquid, and liquids become gaseous. If even more energy is supplied to a gas, it is ionized and goes into the energy-rich plasma state. A plasma (or ionized air) can be created by heating a gas (such as ambient air) or subjecting the gas to a strong electromagnetic field applied with a generator (such as a laser or microwave generator). This decreases or increases the number of electrons, creating positive or negative charged particles or ions, and is accompanied by the dissociation of molecular bonds, if present. The ionized air source may include an ionizer that uses electrostatically charged plates to produce positively or negatively charged gas ions (for instance $N_2^-$ or $O_2^-$) that organic and particulate matter sticks to in an effect similar to static electricity. For example, ionized air may include air in which the oxygen content has been given an electrical charge, which may include a negative charge due to the presence of one or more extra electrons per oxygen molecule, or a positive charge due to the presence of less than the normal number of electrons per molecule. It will be appreciated that the ionized air (herein also referred to as ionic air or plasma) generated by the ionized air source may be distinct from ozone (which includes a triple bonded molecule of oxygen). The ionizer (or plasma generator or ionized air source) may use charged electrical surfaces or needles to generate electrically charged air or gas ions. These ions may attach to particulate matter which are then oxidized or electrostatically attracted to a charged collector plate. The ionizer may be fan-less or fan-based. In one example, the ionizer may include a plasma source, such as the "Openair" (trademark) Plasma Surface Preparation System (made by Plasmatreat, 2541 Technology Drive, Elgin, Ill. 60124).

The ionized air source 202 may be coupled to the intake passage and/or the throttle via a disconnect of a zip tube from the throttle, and by attaching the hose from the ionized air source in its place to the throttle. Alternately, the ionized air source could be connected to the intake air filter, to ensure cleaning of the MAF sensor if one is located by the filter box. During selected conditions, the vehicle may be placed in a service mode by a service technician (such as when the vehicle is brought in to a service provider or dealer). As such, during the service mode, the engine may not be combusting. A service technician may couple the source 202 of ionizing air to the engine air intake or to the throttle body. Concurrently, the service technician may couple a service tool into a diagnostics port 204 of the vehicle (such as an OBD port). By coupling the service tool to the diagnostics port, the service tool may be communicatively coupled to the control system of the vehicle. The service tool may interface with engine and vehicle controls to perform one or more adjustments that improve flow and delivery of ionized air to the engine cylinders. For example, based on service technician input received via the service tool, the control system may open the throttle body (e.g., fully open the intake throttle), advance intake cams and exhaust cams as needed, open the EGR valve (e.g., fully open the EGR valve), and spin the engine without fuel. The engine may be spun without fuel via the electric motor or generator of the hybrid electric vehicle. Alternatively, the engine may be spun without fuel via a starter motor of a non-hybrid vehicle engine.

Upon confirming that the throttle has been opened, the cams have been advanced, and/or the EGR valve has been opened, the ionized air source may be operated to blow high ionic air throughout the engine, and exhaust system. The ionized flow oxidizes organic molecules in the engine intake, engine cylinders, and the engine exhaust. In doing so, various advantages are achieved including for example, engine deposits may be cleaned improving fuel economy, the spark plug may be cleaned reducing spark plug fouling, valve deposits may be cleaned restoring correct flow characteristics, and the throttle body may be cleaned removing sludge deposits and sludge related issues. Further, carbon may be cleaned off of fuel injectors and cylinder walls, while soot may be cleaned off the EGR valve, passage ways, and an exhaust particulate filter.

The ionized air may continue to be delivered for a predefined specific amount of time (e.g., 2 minutes). Thereafter, the process may be ended and the equipment (including the ionized air source and service tool) may be removed. The engine may then be determined to be refurbished. A subsequent refurbishment may not be needed for another threshold amount of vehicle operation (e.g., another 100,000 miles).

Now turning to FIG. 3, an example routine 300 is described for performing a cleaning operation of the engine using ionized air, according to the present disclosure. By streaming ionized air into the engine, while spinning the engine unfueled using motor torque and while increasing flow of ionized air through the cylinders by opening the throttle and advancing the intake/exhaust cams, engine cleaning may be performed less intrusively (e.g., without the need for disassembly) and substantially automatically. In addition, a time and labor required by a technician is reduced.

At 302, the routine includes confirming that a request for an ionic tune-up has been received at the vehicle. In one example, the request for an ionic tune-up may be received by the vehicle from a service technician while the vehicle is in a key-off condition (e.g., parked in a garage). The service technician may request the tune-up using a simple diagnostic tool that attaches on to the vehicle at a diagnostic port (or an alternate location on the body of the vehicle). Further, the request may be received via the service technician placing the vehicle in a service mode of operation, such as via a touch-interactive display on the vehicle's dashboard. The service mode may place the vehicle in a selected non-combusting engine operating condition.

Upon confirming the ionic tune-up request, at 304, the service tool connected at the diagnostic port may be communicatively coupled to the control system of the vehicle. As such, this allows one or more vehicle and engine components to be controlled and adjusted based on operator input (from the service technician) received via the service tool.

At 306, the routine includes, based on the operator input, spinning the engine unfueled. Specifically, the engine may be spun unfueled using motor torque from a battery-driven electric motor (or generator) of the vehicle system. The electric motor may be, in one example, an electric motor/generator of a hybrid electric vehicle. In another example, the electric motor may be a starter motor of a non-hybrid electric vehicle. The spinning may be performed with the intake valve timing advanced and intake throttle open, as discussed at 308-312. Specifically, torque from the electric motor/generator of the vehicle may be used to spin the engine at a first, higher engine speed (e.g., 1000 rpm) for a first, shorter duration (e.g., 15 seconds). This initial spin is used to reduce or remove friction variability in compression resulting from a lack of oil film and to build enough oil pressure at an engine-driven oil pump to help actuate the intake cam.

At 308, the intake throttle may be opened (e.g., fully opened). For example, the throttle body may be opened. At 310, the intake valve timing may be advanced (e.g., fully advanced) by advancing (e.g., fully advancing) the intake cam. In addition, exhaust valve timing may be advanced (e.g., fully advanced) by advancing (e.g., fully advancing) the exhaust cam. At 312, the EGR valve may be opened (e.g., fully opened). By spinning the engine with at least the intake valve fully advanced and the intake throttle fully open, an amount of ionized air can be circulated throughout the engine system to ionize and remove any organic matter in a reasonable amount of time, for example 3 minutes.

At 314, while continuing to rotate the engine unfueled, the method includes introducing ionized air into the engine (specifically into engine cylinders). The ionized air may be received from an ionized air source coupled to the air induction system of the engine. The ionized air source may be external to the engine and may have been hooked to the air induction system, such as at the intake passage or intake throttle, by the service technician during the service mode of vehicle operation to enable the ionic tune-up to be performed. As such, the introducing of ionized air and spinning of the engine unfueled is performed responsive to input from the operator (herein, the service technician). When the ionized air is introduced, a timer may be concurrently started. The controller may then continue to flow ionized air through the spinning engine, with one or more of the intake throttle fully open, the EGR valve fully open, and the intake and exhaust cams fully advanced, for a specified duration.

At 316, the routine includes oxidizing organic matter in the engine intake, including in the engine cylinders, using the introduced ionized air. For example, sludge on the throttle body may be oxidized, carbon on the spark plugs may be oxidized, and sludge on the cylinder valves may also be oxidized. At 318, the routine further includes flowing the ionized air from the engine intake and engine cylinders to the engine exhaust and oxidizing organic matter in the exhaust using the ionized air. For example, soot on an exhaust emission control device, such as an exhaust particulate filter, may be oxidized. In this way, the ionized air may be flowed through the engine intake and exhaust, oxidizing organic matter in the engine, before the ionized air and oxidized matter is expelled to the atmosphere.

In one example, after the initial spinning of the engine (before ionized airflow is introduced), the engine may be spun (while the ionized airflow is introduced) at a second, lower speed (e.g., 1000 rpm to as low as 200 rpm) for a second, longer duration (e.g., 30 seconds). The second engine speed may be lower than the first engine speed, and may include an engine speed reduced to be the lowest achievable engine speed that retains sufficient engine speed control. In addition, the second speed may be based on battery state of charge (battery SOC), the speed increased as the battery SOC increases. However, if the battery SOC falls below a threshold, the ionic tune-up may be aborted and the engine may be spun fueled to recharge the battery SOC and avoid vehicle incapacitation.

At 320, it may be determined if a threshold duration (e.g., 2 minutes) has elapsed since the timer was started and the ionized airflow into the engine was initiated. If not, at 322, the routine includes continuing to flow ionized air through the spinning engine. Else, after the threshold duration has elapsed, the routine includes discontinuing the introduction of ionized air and decoupling the service tool from the control system of the vehicle. Thereafter, further engine adjustments may not be performed based on input received via the service tool.

In this way, the engine may be tuned-up using ionized air. Following the ionic refurbishment, the engine may not need another ionic tune up until a threshold duration/distance of vehicle operation has elapsed. For example, a subsequent tune-up may be required only after another 100,000 miles of vehicle operation.

Figure 4:
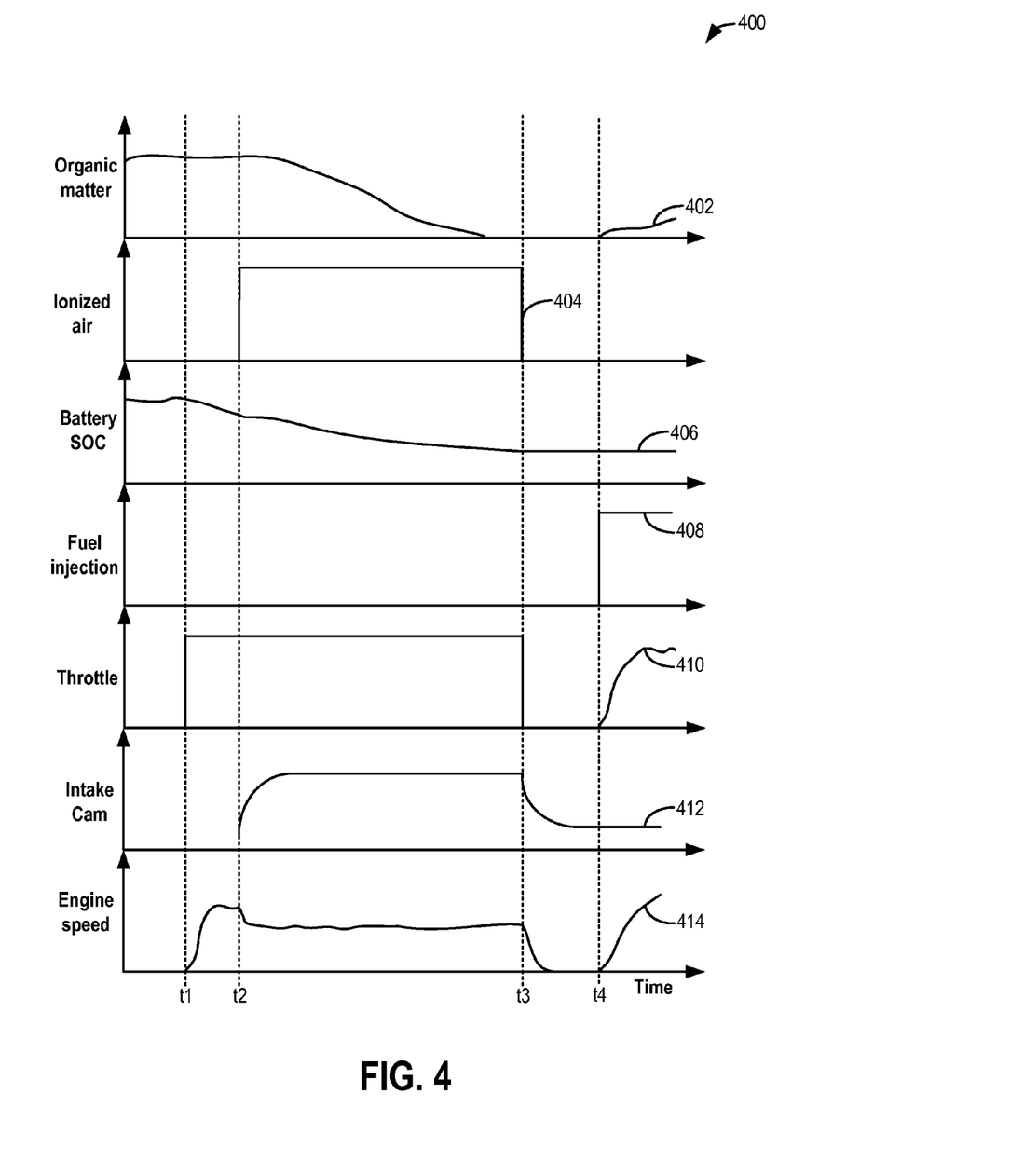
FIG. 4 shows an example engine cleaning using a stream of ionized air, according to the present disclosure.

Now turning to FIG. 4, map 400 shows an example engine cleaning using a stream of ionic air. The method allows organic matter, such as sludge and soot to be removed from the engine of a vehicle in a less intrusive manner.

Map 400 depicts organic matter build-up at an engine at plot 402. The organic matter level may reflect an organic matter build-up at an engine component (such as a valve, spark plug, throttle, or exhaust particulate filter) or an overall engine organic matter build-up. Plot 404, depicts the delivery (on or off) of ionized air from an ionized air source coupled to the engine intake system, plot 406 depicts the state of charge (SOC) of a vehicle system battery, plot 408 depicts engine fueling (on or off), plot 410 depicts an intake throttle opening, plot 412 depicts intake cam timing, and plot 414 depicts engine rotation speed.

Prior to t1, the vehicle, including the engine, may be shutdown. As such, there may be significant organic matter build-up in the engine (plot 402). At t1, the engine may be shifted to a service mode in response to input from an operator (such as a service technician). For example, at t1, the operator may connect a service tool to the vehicle diagnostics port and connect an ionized air source to the engine intake passage. Once connected to the diagnostics port, the service tool may be communicatively coupled to the vehicle's control system. Thus, based on the operator input at t1, the intake throttle may be opened, herein fully opened (plot 410). In addition, based on the operator input, between t1 and t2, the engine may be spun (e.g., at 1000-2000 rpm) unfueled, using energy from a system battery (plot 406). This initial engine spin may allow oil pressure to build for cam actuation.

At t2, the built-up oil pressure is used to advance intake cams from a nominal timing (plot 412). While not depicted, the oil pressure may also be used to advance exhaust cams. Also at t2, engine rotation may be continued, but at a lower speed (e.g., 200-1000 rpm). In addition, ionized air delivery may be initiated. For example, a pump or ionizer of the ionized air source may be operated to generate and flow ionized air into the engine.

Ionized air delivery may be continued for a predefined duration from t2 to t3 during which time the ionized air may oxidize organic matter in the engine (e.g., in the engine intake, at the intake throttle, inside the cylinder, at the spark plug, at the cylinder valves, and in the engine exhaust) before expelling the air through an exhaust tailpipe. Therefore as the ionized airflow progresses, the level of organic matter in the engine may drop (plot 402).

At t3, streaming of ionized air may be stopped. In addition, the intake throttle may be returned to a closed position and the cam timing may be returned to the nominal timing. At a later time t4, in response to an engine restart request, engine fueling may be resumed and the engine may be spun fueled. In addition, the throttle may be opened and the cam timing may be adjusted based on engine operating conditions.

In one example, an ionic tune-up of a vehicle engine is achieved by a method for an engine coupled in a vehicle, the method comprising: during a service mode of vehicle operation where the engine is not combusting, receiving input from an operator via a service diagnostic tool coupled to the vehicle; and concurrently, receiving ionized air in an engine air intake system from an ionized air source coupled to the vehicle. Further, based on the operator input, an engine controller may adjust one or more of an intake throttle opening, an EGR valve opening, an intake cam timing, and an exhaust cam timing. The adjusting may include one or more of fully opening the intake throttle, fully opening the EGR valve, and fully advancing the intake cam timing and exhaust cam timing. In one example, the vehicle is a hybrid vehicle including an electric motor, and the method further comprises, based on the operator input, rotating the engine unfueled via the electric motor to a position based on the operator input and maintaining the engine at the position via motor torque until an operator input indicating completion of ionized air engine cleaning is received. The method may further include flowing the received ionized air into engine cylinders to oxidize organic matter in the cylinders using the ionized air, and then flowing the received air to an engine exhaust to oxidize organic matter in the exhaust using the ionized air.

In another example, a vehicle system comprises: an engine including an intake, an exhaust, and a plurality of engine cylinders; a diagnostics port; and a controller. The controller may be configured with computer-readable instructions stored on non-transitory memory for: shifting the vehicle to a service mode during selected non-combusting conditions when a service mode is requested by an operator; receiving operator input via a service tool connected to the diagnostics port, the service tool communicatively coupled to a vehicle control system during the service mode; and flowing ionized air, received from an external ionized air source coupled to the engine intake, through the plurality of engine cylinders while spinning the engine unfueled. The engine intake may include an intake throttle, and the controller may include further instructions for increasing an opening of the intake throttle based on the operator input. The plurality of engine cylinders may each include an intake valve operated via an intake cam and an exhaust valve operated via an exhaust cam, and the controller may include further instructions for fully advancing each of the intake cam and the exhaust cam based on the operator input. In one example, the vehicle system may be a hybrid vehicle system including an electric motor, wherein the controller includes further instructions for spinning the engine unfueled via the motor based on the operator input while flowing the ionized air.

In another representation, a vehicle system comprises: an engine including an intake, an exhaust, and a plurality of engine cylinders; a diagnostics port; a starter motor for cranking the engine during a start, and a controller. The controller may be configured with computer-readable instructions stored on non-transitory memory for: shifting the vehicle to a service mode during selected non-combusting conditions when a service mode is requested by an operator; receiving operator input via a service tool connected to the diagnostics port, the service tool communicatively coupled to a vehicle control system during the service mode; and flowing ionized air, received from an external ionized air source coupled to the engine intake, through the plurality of engine cylinders while spinning the engine unfueled. Specifically, based on operator input, received via the service tool, the starter motor may be operated to spin the engine unfueled. The engine may be spun for a first, shorter duration at a first, higher speed, before the flowing of ionized air is initiated using motor torque from the starter motor. The first duration and the first speed may be adjusted to provide sufficient oil pressure to actuate intake and exhaust cams. The engine may then be spin for a second, longer duration at a second, lower speed using motor torque from the starter motor. The second duration and second speed may be adjusted to flow a sufficient amount of ionized air throughout the engine and oxidize engine organic matter from various engine components. The engine intake may include an intake throttle, and the controller may include further instructions for increasing an opening of the intake throttle (e.g., fully opening the throttle) based on the operator input. The plurality of engine cylinders may each include an intake valve operated via an intake cam and an exhaust valve operated via an exhaust cam, and the controller may include further instructions for fully advancing each of the intake cam and the exhaust cam based on the operator input.

In this way, an engine tune-up can be performed using an ionized air stream that reduces the amount of time, labor and complexity required by a technician for engine cleaning. By using ionized air introduced into the engine to oxidize soot, hydrocarbons, sludge, and other organic matter deposited on various engine components, component degradation is reduced, improving engine performance and reducing warranty issues. Further, the need for replacing engine components is reduced. By refurbishing engine components without requiring engine disassembly, damage to engine components during the cleaning is reduced. Overall, engine fuel economy can be improved while issues related to engine component aging can be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, I-3, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
introducing ionized air into an engine cylinder while rotating the engine unfueled; and
oxidizing organic matter in the cylinder using the introduced ionized air, wherein the introducing of ionized air and rotating the engine unfueled is responsive to input from an operator, the operator including a service technician.

2. The method of claim 1, wherein introducing ionized air includes introducing ionized air from an ionized air source external to the engine.

3. The method of claim 2, wherein introducing ionized air into the cylinder includes receiving ionized air from the ionized air source at an engine air induction system, and flowing the received ionized air from the air induction system to the engine cylinder.

4. The method of claim 3, further comprising, flowing ionized air from the engine cylinder to an engine exhaust and oxidizing organic matter in the exhaust using the ionized air.

5. The method of claim 1, wherein the operator input is received via a service tool coupled to a diagnostics port of the vehicle.

6. The method of claim 5, further comprising, communicatively coupling the service tool to a control system of the vehicle.

7. The method of claim 6, further comprising, fully opening one or more of an intake throttle and an EGR valve while introducing the ionized air based on operator input received via the service tool.

8. The method of claim 6, further comprising, fully advancing intake and/or exhaust cams while introducing the ionized air based on operator input received via the service tool.

9. The method of claim 6, further comprising, after a threshold duration, discontinuing the introducing of the ionized air, and decoupling the service tool from the control system of the vehicle.

10. The method of claim 1, wherein the introducing includes introducing ionized air during selected non-combusting engine conditions in which the vehicle has been placed into a service mode.

11. A method for an engine coupled in a vehicle, comprising:
during a service mode of vehicle operation where the engine is not combusting, receiving input from an operator via a service diagnostic tool coupled to the vehicle; and concurrently, receiving ionized air in an engine air intake system from an ionized air source coupled to the vehicle.

12. The method of claim 11, further comprising, based on the operator input, adjusting one or more of an intake throttle opening, an EGR valve opening, an intake cam timing, and an exhaust cam timing.

13. The method of claim 12, wherein the adjusting includes one or more of fully opening the intake throttle, fully opening the EGR valve, and fully advancing the intake cam timing and exhaust cam timing.

14. The method of claim 12, wherein the vehicle includes an electric starter motor for cranking the engine during an engine start, the method further comprising, based on the operator input, rotating the engine unfueled via the electric starter motor to a position based on the operator input and maintaining the engine at the position via motor torque until an operator input indicating completion of ionized air engine cleaning is received.

15. The method of claim 11, further comprising, flowing the received ionized air into engine cylinders to oxidize organic matter in the cylinders using the ionized air, and then flowing the received ionized air to an engine exhaust to oxidize organic matter in the exhaust using the ionized air.

16. A vehicle system, comprising:
an engine including an intake, an exhaust, and a plurality of engine cylinders;
a diagnostics port; and
a controller with computer-readable instructions stored on non-transitory memory for:
shifting a vehicle to a service mode during selected non-combusting conditions when a service mode is requested by an operator;
receiving operator input via a service tool connected to the diagnostics port, the service tool communicatively coupled to a vehicle control system during the service mode; and
flowing ionized air, received from an external ionized air source coupled to the engine intake, through the plurality of engine cylinders while spinning the engine unfueled.

17. The system of claim 16, wherein the engine intake includes an intake throttle, and wherein the controller includes further instructions for increasing an opening of the intake throttle based on the operator input.

18. The system of claim 16, wherein the plurality of engine cylinders includes an intake valve operated via an intake cam and an exhaust valve operated via an exhaust cam, and wherein the controller includes further instructions for fully advancing each of the intake cam and the exhaust cam based on the operator input.

19. The system of claim 16, wherein the vehicle system is a hybrid vehicle system including an electric motor, and wherein the controller includes further instructions for spinning the engine unfueled via the motor based on the operator input while flowing the ionized air.

* * * * *